(12) United States Patent
Wheeler et al.

(10) Patent No.: US 7,047,526 B1
(45) Date of Patent: *May 16, 2006

(54) GENERIC COMMAND INTERFACE FOR MULTIPLE EXECUTABLE ROUTINES

(75) Inventors: Jeffrey Wheeler, Glen Allen, VA (US); Paul Mustoe, Midlothian, VA (US)

(73) Assignee: Cisco Technology, Inc., San Jose, CA (US)

( * ) Notice: Subject to any disclaimer, the term of this patent is extended or adjusted under 35 U.S.C. 154(b) by 918 days.

This patent is subject to a terminal disclaimer.

(21) Appl. No.: 09/604,880

(22) Filed: Jun. 28, 2000

(51) Int. Cl.
*G06F 9/44* (2006.01)

(52) U.S. Cl. ............... 717/143; 717/144; 717/136; 717/127; 707/3; 707/10; 707/100; 719/320

(58) Field of Classification Search ........ 717/136–167, 717/127; 707/100, 3, 10; 719/320
See application file for complete search history.

(56) References Cited

U.S. PATENT DOCUMENTS

| | | | |
|---|---|---|---|
| 4,837,798 A | | 6/1989 | Cohen et al. |
| 5,086,504 A | * | 2/1992 | Nemeth-Johannes et al. .... 717/143 |
| 5,379,419 A | * | 1/1995 | Heffernan et al. .............. 707/4 |
| 5,491,796 A | * | 2/1996 | Wanderer et al. ............ 709/224 |
| 5,680,622 A | * | 10/1997 | Even ........................... 717/154 |
| 5,732,274 A | * | 3/1998 | O'Neil ......................... 717/143 |
| 5,790,863 A | * | 8/1998 | Simonyi ....................... 717/113 |
| 5,835,757 A | * | 11/1998 | Oulid-Aissa et al. .......... 707/10 |
| 5,864,843 A | * | 1/1999 | Carino et al. .................. 707/4 |
| 5,911,072 A | * | 6/1999 | Simonyi ....................... 717/105 |
| 6,088,731 A | * | 7/2000 | Kiraly et al. ................ 709/229 |
| 6,134,709 A | * | 10/2000 | Pratt .......................... 717/143 |
| 6,138,098 A | * | 10/2000 | Shieber et al. ............... 704/257 |
| 6,226,655 B1 | * | 5/2001 | Borman et al. ........... 715/501.1 |
| 6,263,339 B1 | * | 7/2001 | Hirsch ......................... 707/102 |
| 6,282,547 B1 | * | 8/2001 | Hirsch ......................... 707/102 |
| 6,397,263 B1 | * | 5/2002 | Hancock et al. ............. 709/322 |
| 6,405,209 B1 | * | 6/2002 | Obendorf ................ 707/103 R |
| 6,405,365 B1 | * | 6/2002 | Lee ............................. 717/106 |
| 6,516,356 B1 | * | 2/2003 | Belknap et al. .............. 719/328 |
| 6,654,747 B1 | * | 11/2003 | Van Huben et al. .......... 707/10 |
| 6,665,594 B1 | * | 12/2003 | Armstrong ................... 701/13 |

* cited by examiner

*Primary Examiner*—St. John Courtenay III
(74) *Attorney, Agent, or Firm*—Leon R. Turkevich

(57) ABSTRACT

A processor based system having a parser is configured for validating a generic command received from a user relative to a command parse tree. The command parse tree includes multiple elements, each specifying at least one corresponding generic command component and a corresponding at least one command action value. The parser, upon identifying a best match among the elements, issues a prescribed command for a selected one of the management programs according to the corresponding command format based on the selected command action value. Hence, a user may control multiple management programs having respective command formats, by using a set of generic commands that are independent from the command formats, eliminating the necessity that the user needs to learn the detailed command formats and syntax.

26 Claims, 3 Drawing Sheets

GENERIC COMMAND INTERFACE FOR MULTIPLE EXECUTABLE ROUTINES

BACKGROUND OF THE INVENTION

1. Field of the Invention

The present invention relates to command and interface control of Operating Administration and Monitoring (OAM) executable routines within software systems.

2. Description of the Related Art

Operating Administration and Monitoring (OAM) tools are software-based resources used as administration and/or diagnostic tools for complex processor-based executable software systems, such as software-based unified messaging software systems. A subset of OAM tools includes Real Time Monitoring (RTM) programs, used to monitor and control selected states and processes within the software based system. For example, a given RTM program may generate a real-time display (i.e., "a screen") of selected parameters during execution of a prescribed process; the RTM program may also provide a diagnostic resource that enables resetting of various states or variables within the prescribed process. Other administration and diagnostic tools include external binary files that execute in response to a procedure call, and Simple Network Management Protocol (SNMP) agents or scripts configured for generating an e-mail message as an alarm in response to a detected event.

Hence, system administrators may attempt to utilize multiple tools within a software system in order to increase the available administration and diagnostic tools for improved system performance. The use of multiple RTM programs and other OAM tools, however, requires the users to remember the names and syntaxes of numerous commands for the respective RTM programs and OAM tools. Hence, an increase in the number of OAM tools would result in the system administrator needing to develop expertise in the command names and syntaxes for the respective OAM tools.

SUMMARY OF THE INVENTION

There is a need for an arrangement that integrates multiple RTM programs and command and control functionality for a user, without the necessity of learning the respective command formats and syntax.

There is also a need for arrangement that enables a simple command language to be utilized for control of multiple RTM programs having respective command formats.

These and other needs are attained by the present invention, where a processor based system having a parser is configured for validating a generic command received from a user relative to a command parse tree. The command parse tree includes multiple elements, each specifying at least one corresponding generic command component and a corresponding at least one command action value. The parser, upon identifying a best match among the elements, issues a prescribed command for a selected one of the management programs according to the corresponding command format based on the selected command action value. Hence, a user may control multiple management programs having respective command formats, by using a set of generic commands that are independent from the command formats, eliminating the necessity that the user needs to learn the detailed command formats and syntax.

One aspect of the present invention provides a method in a processor-based system configured for executing a plurality of management programs according to respective command formats. The method includes receiving a generic command from the user, and validating the generic command based on a command parse tree that specifies valid generic commands relative to a prescribed generic command format, the command parse tree having elements each specifying at least one corresponding generic command component and a corresponding at least one command action value, the validating step including identifying one of the elements as a best match relative to the generic command. The method also includes issuing a prescribed command of a selected one of the management programs according to the corresponding command format, based on the identified one element.

Another aspect of the present invention provides a system configured for executing a plurality of management programs according to respective command formats. The system includes a parser having a command parse tree configured for validating a generic command received from a user, the command parse tree configured for specifying valid generic commands relative to a prescribed generic command format and having elements each specifying at least one corresponding generic command component and a corresponding at least one command action value, the parser identifying one of the elements as a best match relative to the generic command. The system also includes a plurality of translators configured for issuing commands for the management programs according to respective command formats, the parser outputting a prescribed command to a selected one of the translators based on the identified one element.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
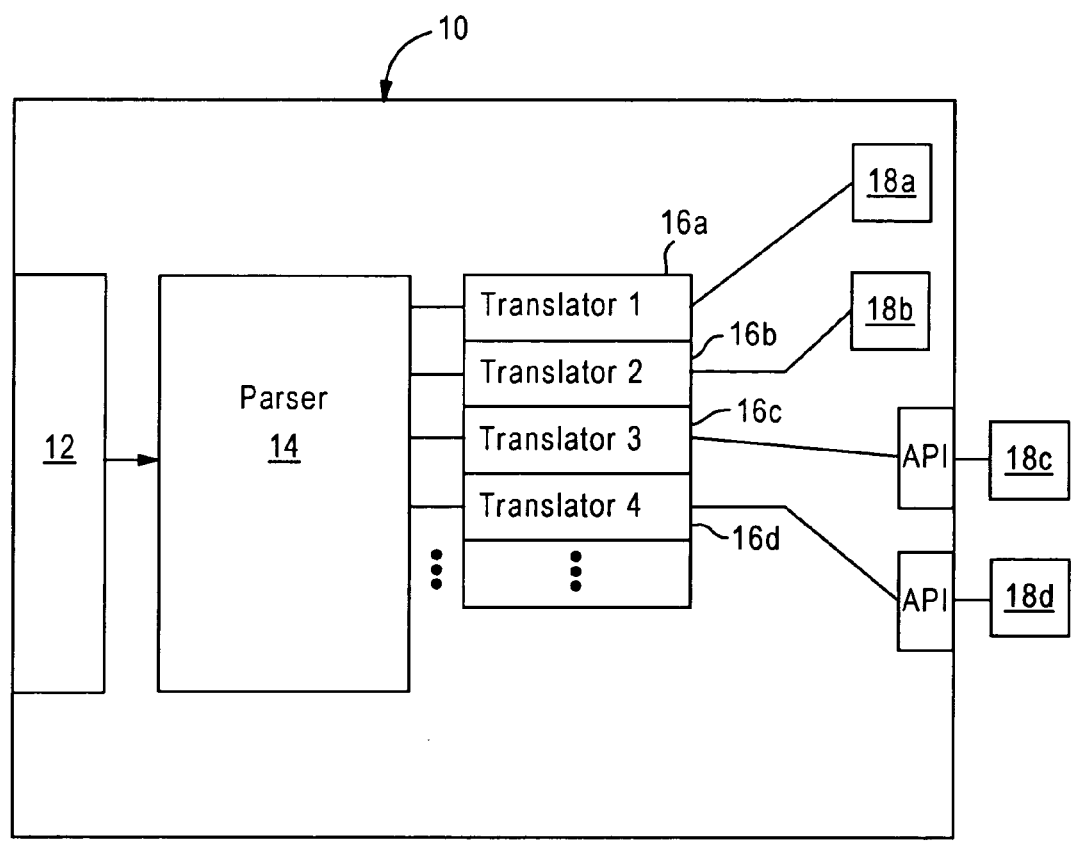
FIG. 1 is a diagram of a system configured for executing multiple management programs according to respective command formats based on a generic command set according to an embodiment of the present invention.

FIG. 1 is a diagram of a system configured for executing a plurality of management programs according to respective command formats according to an embodiment of the present invention. The processor based system 10 includes a user input interface 12, for example a terminal interface, that enables a user to input a generic command string, described below. The processor based system 10 also includes a parser 14 configured for validating the generic command received by the user input interface 12 from the user, and translators 16 configured for issuing commands to respective management programs 18 according to respective command formats. As shown in FIG. 1, the management programs 18, implemented for example by different OAM tools such as RTM programs, may be executed within the processor based system or externally as external agents accessible using a prescribed application programming interface (API). The management programs 18 may provide different administration and maintenance functions, for example initiating various real-time screens used to monitor the internal state of executable processes within the software based system 10; alternately, different tools 18 may allow the user to control the various states within the various component of the software based system 10 via external programs (e.g., programs 18c or 18d), or may be used to issue external alarms (e.g., SNMP manager scripts) for external routines such as message waiting indicator routines.

A disadvantage of utilizing many different tools 18 is that each tool 18 tends to have its own screen and/or command, providing difficulties for the system administrator to determine which tool is the best tool (and/or which is the best syntax) to use for a given problem.

According to the disclosed embodiment, the parser 14 and the translators 16 provide a unified administration and diagnostic tool which incorporates the functionality of all external administrative executable binary files, RTM programs, agent manipulation scripts, and various requested snapshot queries, as well as including an extensive help system. In particular, the parser 14 and the translators 16 provide a generic command syntax that integrates the functionality of the different tools 18 and that automatically selects the appropriate command for the best tool for executing a given generic command. As illustrated in Part A of the attached appendix, the new syntax provides a generic instruction set that provides an abstraction of the tool-specific command formats and syntax, enabling a user to issue command based on the relative functions, as opposed to the specific syntax for a corresponding tool 18.

Figure 2:
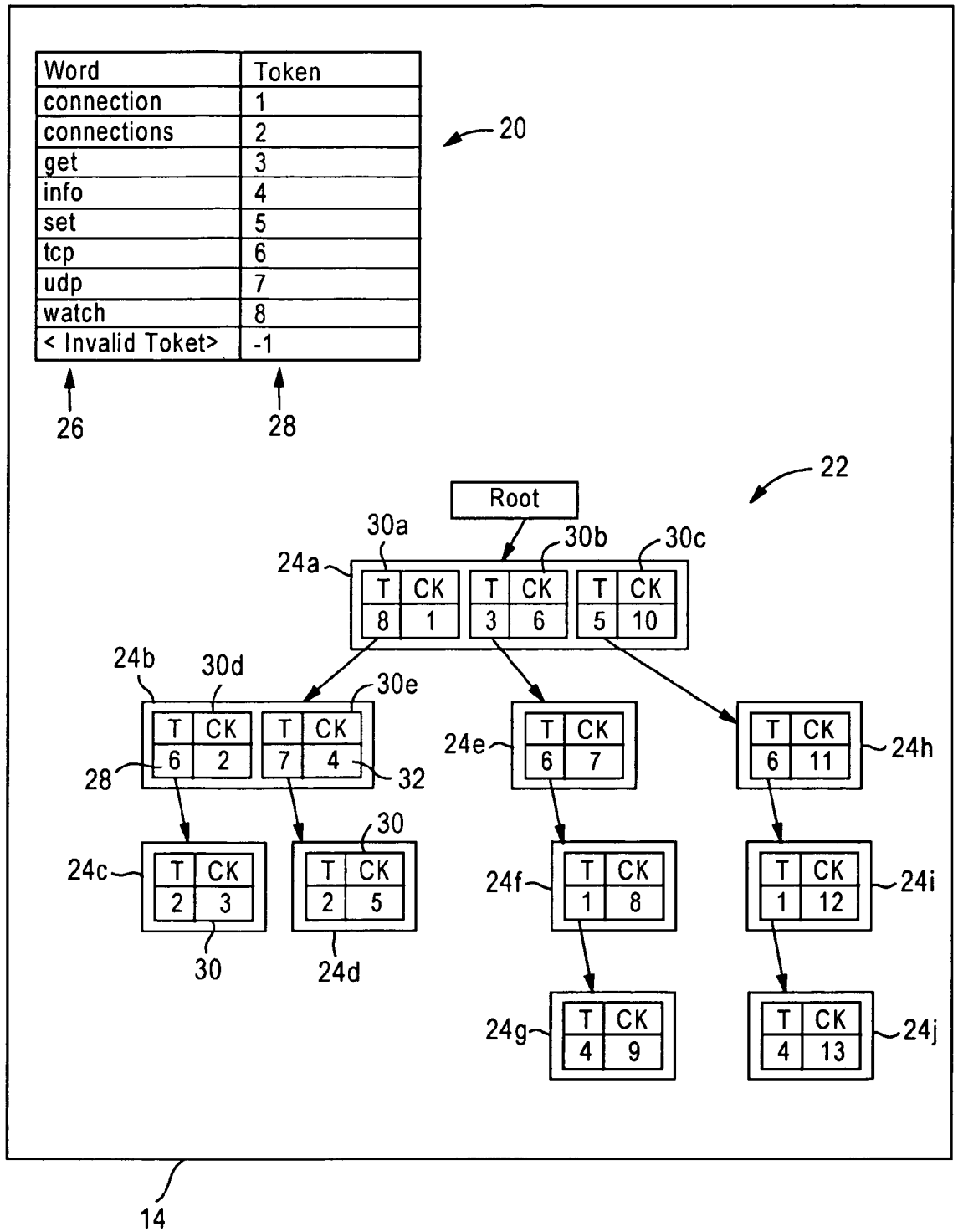
FIG. 2 is a diagram illustrating in detail the parser of FIG. 1 according to an embodiment of the present invention.

FIG. 2 is a diagram illustrating in detail the parser 14 of FIG. 1 according to an embodiment of the present invention. The parser 14 includes a command word translation table 20 and a command parse tree 22. The command word translation table 20 is configured for storing, for each prescribed command word 26, a corresponding token value 28 that is used by the parser 14 to identify a specific command for a selected one of the translators 16. In particular, the command word translation table 20 includes all the command words 26 that are valid according to the generic syntax, illustrated for example in Part B of the attached appendix.

The parser 14 is configured for validating a received generic command by comparing each input command word to the command parse tree 22 to determine for the received generic command a tree element 24 identified as a best match. Each tree element 24 includes at least one token-command key pair 30 that specifies a token (T) 28 and a corresponding command key (CK) 32, enabling the parser 14 to identify the appropriate prescribed command based on the command key specified for the matching token. In particular, the parser 14 recursively traverses the command parse tree 22 for each command word to identify the best match for the generic command. If only a portion of the generic command is identified as valid (e.g., only the first three command words are valid), the parser 14 selects the command key 32 for the matching token 28 from the last valid tree element 24.

Figure 3:
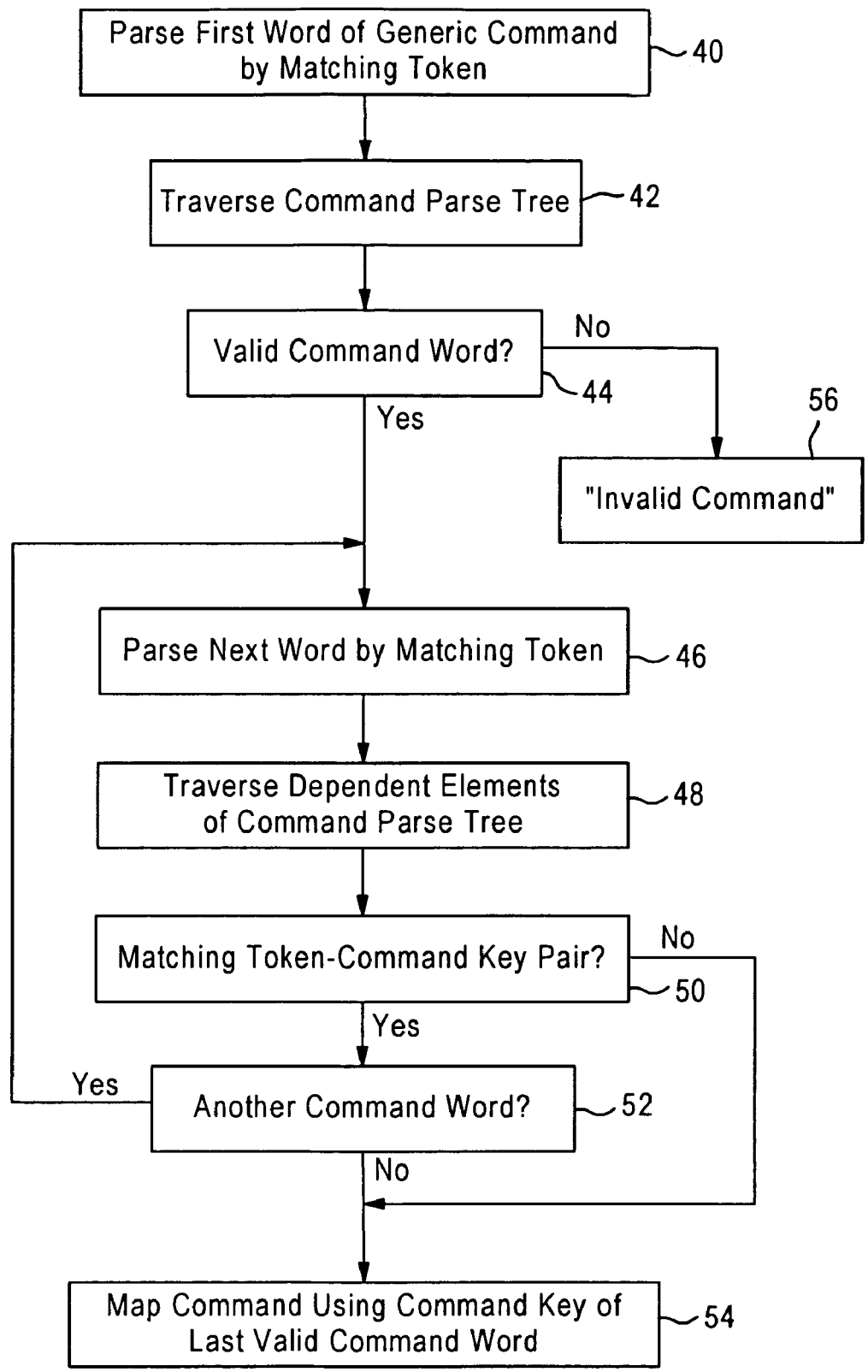
FIG. 3 is a diagram illustrating the validation of generic commands by the parser of FIG. 1 according to an embodiment of the present invention.

FIG. 3 is a diagram illustrating the method of validating a received generic command and translating the received generic command into a command for a specific management program according to an embodiment of the present invention. The operations described with respect to FIGS. 2 and 3 can be implemented as executable code that is stored on a computer readable medium (e.g., a hard disk drive, a floppy drive, a random access memory, a read only memory, an EPROM, a compact disk, etc). The method begins in step 40, wherein the parser begins parsing the first word of the received generic command by comparing the first input command word to the command word translation table 20 for identification of a matching token 28. For example, assume that the parser 14 receives the valid command "watch tcp connections". The parser identifies the token value "8" as corresponding to the first command word "watch". The parser 14 than traverses the command parse tree 22 in step 42 to search for the matching token 28. As illustrated in FIG. 2, the parser 14 locates the matching token in the first tree element 24a. If the parser 14 determines in step 44 that the first command word is valid, the parser 14 continues searching the next command word in step 46. If the first command word is invalid based on no match in the first element 24a of the command parse tree, the parser 14 returns an invalid command message to the user in step 56.

The parser 14 then parses the next word (e.g., "tcp") of the received generic command in step 46 by locating the corresponding token 28 (e.g., "6" for "tcp") in the table 20, and then traversing in step 48 the tree elements that depend from the matched tree element 24a (e.g., 24b). The parser 14 determines a match between the token 28 ("6") corresponding to the command word "tcp" in the token-command key pair 30d in step 50, enabling the parser to continue for the next command word. As described above, the parser 14 repeats the process in step 52 for the third command word "connections" having the token "2" and identifying a match between the entire generic command and the token-command key 30 specified in the tree element 24c. The parser 14 identifies in step 54 the prescribed command for a selected one of the translators 16 based on the value of the command key 32 within the matching token-command key pair 30 (e.g., "CK=3") of the last valid command word, which maps to a translation table that specifies a specific command for a specific translator 16.

As described above, the parser 14 can identify a command key 32 even if only a portion of the command is valid. Assume for example that the parser 14 receives the invalid command "get udp connection info". In this case, the individual command words are valid from the command word translation table 20, however, the sequence is invalid. In particular, the command word "get" having a token value of "3" reaches the token-command key pair 30b, however the command word "udp" having a token value of "7" does not reach any child of the tree element 24a. Hence, the parser 14 uses the last valid command key ("6") in step 54 based on the matching token for the first valid word located in the token-command key pair 30b. The command key is mapped to a selected one of the translators 16 in an attempt to provide a command to the corresponding resource 18. If the selected resource 18 determines that the command is invalid, the selected resource 18 at that time may prompt the user for a correct command.

The disclosed arrangement enables the use of generic commands for multiple OAM tools that have respective command syntax, resulting in a single point of entry for administering and maintaining complex software based systems. The disclosed arrangement provides the user a single set of commands and syntax to learn, facilitating the use of multiple administrative and maintenance tools.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

| APPENDIX PART A: Command Syntax Mapping | | |
|---|---|---|
| Functional Item | New Syntax | Old Command Line/Syntax |
| Set RTM Sample Times | set watchtime <# in ms> | <Object>view -t <# in ms> (from command line only) |
| Get RTM Sample Times | get watchtime | - None - |
| Watch BASE Global Client/Server Information | watch acb globals | BASEview<br>BASEview -g<br>BASEview -h then press g |
| Watch BASE Thread Information | watch acb threads | BASEview -h[<Rec#>]<br>BASEview then press h |
| Watch APP Global Information | watch acb globals | APPview<br>APPview -g<br>APPview -i then press g |
| Watch APP ICT Table Entry Information | watch acb entries | APPview -i[<Rec#>]<br>APPview then press i |
| Watch TNT Group Information | watch cma groups | TNTview then press g |
| Watch TNT Session Information | watch cma sessions | TNTview |
| Watch H323 Information | watch h323 entries | H323view<br>H323view -h \| H<Rec#><br>H323view -r \| -s then press h |
| Watch Radvision Information | watch h323 radvision | H323view -r \| R<Rec#><br>H323view then press r |
| Watch H323 State Information | watch h323 states | H323view -s \| S<Rec#><br>H323view [-r] then press s |
| Start BASE | start system | obs -o APP -s up<br>possibly startobj.ksh |
| Quiesce BASE | quiesce acb | obs -o APP -s quiesce |
| Stop BASE | stop system | obs -o APP -s down |
| Start TNT | start cma | obs -o TNT -s up |
| Stop TNT | stop cma | obs -o TNT -s down |
| Quiesce TNT | quiesce cma | obs -o APP -s quiesce |
| Get BASE status | get system status | obs -o APP |
| Get Application status | watch acb entries | obs -o TNT<br>ps eaf \| grep <Application> |
| Reload all ICT entries | reload sched all | reloadsched |
| Reload specific ICT entry | reload sched static <Static Application><br>(where <Static Application> could be TNT, LogRemover, etc.) | reloadstatic <APP><br>possibly startapp <APP> |
| Get schedule table | watch acb entries | More $PARMLIB/parms/APP/Sched* |
| Get current logging level for APP | set loglevels | - None -? |
| Set error logging level for APP | set loglevel acb error <off \| local> | loglevel APP error <off \| local> |
| Set warning logging level for APP | set loglevel acb warning <off \| local> | loglevel APP warning <off \| local> |
| Set info logging level for APP | set loglevel acb info <off \| local> | loglevel APP info <off \| local> |
| Set debug logging level for APP | set loglevel acb debug <off \| local> | loglevel APP debug <off \| local> |
| Get current logging level for TNT | get loglevels | - None - ? |
| Set error logging level for TNT | set loglevel cma error <off \| local> | loglevel TNT error <off \| local> |
| Set warning logging level for TNT | set loglevel cma warning <off \| local> | loglevel TNT warning <off \| local> |
| Set debug logging level for TNT | Set loglevel cma debug <off \| local> | loglevel TNT debug <off \| local> |
| Get Help for RTM functions | help watch | <Object>view -? |
| Get Help for SNMP functions | help [start \| stop \| quiesce] | obs |
| Get Help for reload functions | help reload | reloadsched (no parms, no help)<br>reloadstatic |
| Get Help for logging functions | help set | loglevel |
| Get Help for query functions | help get | Obs |
| Get Help on help | help help | |
| Exit utility | exit | Q key on RTMs |

APPENDIX PART B: Generic Command Examples

Watch
This command displays the requested RTM screen
Command Usage: Watch <Object> [<Screen>]
Valid Object/Screen Pairs:

| Obj | Valid Screens | Description |
| --- | --- | --- |
| acb | globals | Displays ACB Global counters information |
|  | entries | Displays ACB Entry information |
|  | states | Displays ACB States information |
|  | comm | Displays ACB Communication Layer information |
|  | threads | Displays ACB Thread information |
| cma | groups | Display group information |
|  | sessions | Display session information |
|  | scr | Display CMA System Call Router information |
| h323 | entries | Display the full H323 information screen |
|  | radvision | Display the full radvision information screen |
|  | states | Displays the combined (H323/Rad) states info (Note: CMA allocates double the MaxPorts configurable in H323.ini, so this screen will show double the MaxPorts entries) |
| sms |  | Displays SMS information |
| faxprint |  | Displays FaxPrint process information |
| notify |  | Displays MWI_OnOff Notification info |

Get
This command allows the user to request certain system variable values.
Command Usage: get <Variable>
Valid Variables:

| Variable | Description |
| --- | --- |
| watchtime | Gets the number of milliseconds between RTM (watch) screen refreshes |
| system status | Gets the current status of the system (up, down, quiesce) |
| loglevels | Gets the current run-time logging levels for ACB, CMA, and all loaded STATIC/STATIC_NOWAIT agents |

Set
This command allows the used to set either UMCLI variables or overall system variables
Command Usage: set <variable><value>
Valid Variable/Value Pairs:

| Variable | Valid Values | Description |
| --- | --- | --- |
| watchtime | Numeric in milliseconds | Sets the refresh time for RTM screens in milliseconds. Any values less than 500 will be set to 500. |
| loglevel acb error | "off" or "local" | Turns ACT Error level logging off or local |
| loglevel acb warning | "off" or "local" | Turns ACT Warning level logging off or local |
| loglevel acb info | "off" or "local" | Turns ACT Info level logging off or local |
| loglevel cma error | "off" or "local" | Turns CMA Error level logging off or local |
| loglevel cma warning | "off" or "local" | Turns CMA Warning level logging off or local |
| loglevel cma info | "off" or "local" | Turns CMA Info level logging off or local |
| loglevel cma debug | "off" or "local" | Turns CMA Debug level logging off or local |
| loglevel <PID> error | "off" or "local" | Turns <PID> Error level logging off or local (where <PID> is the PID of any scheduled agent) |
| loglevel <PID> warning | "off" or "local" | Turns <PID> Warning level logging off or local (where <PID> is the PID of any scheduled agent) |
| loglevel <PID> info | "off" or "local" | Turns <PID> Info level logging off or local (where <PID> is the PID of any scheduled agent) |
| loglevel <PID> debug | "off" or "local" | Turns <PID> Debug level logging off or local (where <PID> is the PID of any scheduled agent) |

Start
This command allows the user to start various system agents or the entire system.
Command Usage: start <Agent>
Valid Agents:

| Agent | Description |
| --- | --- |
| system | Starts the entire system |
| acb | Starts a manually stopped or quiesced ACB agent |
| cma | Starts a manually stopped or quiesced CMA agent (new functionality coming to allow quiesce of CMA . . . start will be implemented with a spobjstate CMA R command) |
| logging | Starts the logging subsystem |

Stop
This command allows the user to stop the TNT agent or the entire system.
This command does NOT bring any running LOGSUB process down, since it is a peer process to the system and could be used by external agents which could still be running and need the service.
Command Usage: stop <Agent><Screen>
Valid Agents:

| Agent | Description |
| --- | --- |
| system | Stops the entire system (including Logging) |
| acb | Stops a running or quiesced ACB agent |
| cma | Stops a running or quiesced CMA agent |
| logging | Stops the logging subsystem only if the ACB agent is down |

Quiesce
This command allows the user to quiesce the APP or TNT agent.
Command Usage: quiesce <Agent>
Valid Agents:

| Agent | Description |
| --- | --- |
| acb | Quiesces acb |
| cma | Quiesces a running CMA agent |

Reload
This command allows the user to reload various configuration files.
Command Usage: reload <Agent> [<Parameters>]
Valid Applications:

| Application | Parameters | Description |
| --- | --- | --- |
| cmaloglevels |  | Causes CMA to reload the DBG and TRACE sections of the $PARMLIB/TNT/parms/TNT.ini configuration file. |
| Dialmap |  | Causes CMA to reload $PARMLIB/TNT/parms/DialMap.ini |
| Route | "acb" or "cma" | Causes ACB to reload either $PARMLIB/parms/APP/Route.<hostname> (acb) or $PARMLIB/parms/TNT/Route.<hostname> (cma) |
| Sched | "all" or "static <token>" | Causes ACB to reschedule either all or a single agent defined in $PARMLIB/parms/APP/Schedule.<hostname>. (Use of the static <token> parameter requires that <token> had previously been scheduled either as a STATIC or STATIC_NOWAIT.) |

Help
This command allows the user to get help on the valid commands available, their usage, and what they mean.
Command Usage: help [<command>]
Valid Commands:

| Commands | Description |
| --- | --- |

-continued

APPENDIX PART B: Generic Command Examples

| | |
|---|---|
| <None> | Help without any parameters gives the users either a list of the top level commands (help set to "short") or the top level commands and all valid sub commands under each top level commands (help set to "full") |
| watch | Gives the user a list of valid screens and what each one is |
| get | Gives the user a list of valid variables to query |
| set | Gives the user a list of valid variables and valid values for each variable |
| start | Gives the user a list of valid Agents to start |
| stop | Gives the user a list of valid Agents to stop |
| quiesce | Gives the user a list of valid Agents to quiesce |
| reload | Gives the user a list of valid Configurables (and possibly optional parameters) to reload. |
| help | The ubiquitous help on help (probably not necessary . . . ) |

What is claimed is:

1. A method in a processor-based system configured for executing a plurality of management programs according to respective command formats, the method comprising:
   receiving a generic command from the user;
   validating the generic command based on a command parse tree that specifies valid generic commands relative to a prescribed generic command format, the command parse tree having elements each specifying at least one corresponding generic command component and a corresponding at least one command action value, the validating step including identifying one of the elements as a best match relative to the generic command; and
   issuing a prescribed command of a selected one of the management programs according to the corresponding command format, based on the identified one element.

2. The method of claim 1, wherein the generic command includes at least one input command word, the validating step including:
   comparing each input command word to a command word translation table, configured for storing for each prescribed command word a corresponding token, for identification of a matching token; and
   determining a presence of the matching token within the command parse tree for each input command word.

3. The method of claim 2, wherein the determining step includes recursively traversing the command parse tree based on an order of the input command words for identification of the matching token within the identified one element.

4. The method of claim 3, wherein the issuing step includes issuing the prescribed command based on a corresponding command key specified for the matching token within the identified one element.

5. The method of claim 4, wherein the issuing step further includes accessing a prescribed translator configured for converting the generic command according to the corresponding command format into the prescribed command based on the corresponding command key.

6. The method of claim 5, wherein the validating step including validating at least a portion of the generic command by identifying the one element having the best match relative to the portion of the generic command, the issuing step including issuing the prescribed command based on the identified one element corresponding to the portion of the generic command.

7. The method of claim 6, further comprising executing the prescribed command within the corresponding selected one management program.

8. The method of claim 1, wherein the validating step including validating at least a portion of the generic command by identifying the one element having the best match relative to the portion of the generic command, the issuing step including issuing the prescribed command based on the identified one element corresponding to the portion of the generic command.

9. The method of claim 8, further comprising executing the prescribed command within the corresponding selected one management program.

10. A system configured for executing a plurality of management programs according to respective command formats, the system comprising:
    a parser having a command parse tree configured for validating a generic command received from a user, the command parse tree configured for specifying valid generic commands relative to a prescribed generic command format and having elements each specifying at least one corresponding generic command component and a corresponding at least one command action value, the parser identifying one of the elements as a best match relative to the generic command; and
    a plurality of translators configured for issuing commands for the management programs according to respective command formats, the parser outputting a prescribed command to a selected one of the translators based on the identified one element.

11. The system of claim 10, wherein the parser further comprises a command word translation table configured for storing for each prescribed command word a corresponding token for identification of a matching token, the parser configured for determining a presence of the matching token within the command parse tree for each input command word.

12. The system of claim 11, wherein the parser recursively traverses the command parse tree based on an order of the input command words for identification of the matching token within the identified one element.

13. The system of claim 12, wherein the parser validates at least a portion of the generic command by identifying the one element having the best match relative to the portion of the generic command.

14. A computer readable medium having stored thereon sequences of instructions for executing a plurality of management programs according to respective command formats, the sequences of instructions including instructions for performing the steps of:
    receiving a generic command from the user;
    validating the generic command based on a command parse tree that specifies valid generic commands relative to a prescribed generic command format, the command parse tree having elements each specifying at least one corresponding generic command component and a corresponding at least one command action value, the validating step including identifying one of the elements as a best match relative to the generic command; and
    issuing a prescribed command of a selected one of the management programs according to the corresponding command format, based on the identified one element.

15. The medium of claim 14, wherein the generic command includes at least one input command word, the validating step including:
    comparing each input command word to a command word translation table, configured for storing for each prescribed command word a corresponding token, for identification of a matching token; and determining a presence of the matching token within the command parse tree for each input command word.

16. The medium of claim 15, wherein the determining step includes recursively traversing the command parse tree based on an order of the input command words for identification of the matching token within the identified one element.

17. The medium of claim 16, wherein the issuing step includes issuing the prescribed command based on a corresponding command key specified for the matching token within the identified one element.

18. The medium of claim 17, wherein the issuing step further includes accessing a prescribed translator configured for converting the generic command according to the corresponding command format into the prescribed command based on the corresponding command key.

19. The medium of claim 18, wherein the validating step including validating at least a portion of the generic command by identifying the one element having the best match relative to the portion of the generic command, the issuing step including issuing the prescribed command based on the identified one element corresponding to the portion of the generic command.

20. The medium of claim 19, further comprising instructions for performing the step of executing the prescribed command within the corresponding selected one management program.

21. The medium of claim 14, wherein the validating step including validating at least a portion of the generic command by identifying the one element having the best match relative to the portion of the generic command, the issuing step including issuing the prescribed command based on the identified one element corresponding to the portion of the generic command.

22. The medium of claim 21, further comprising instructions for performing the step of executing the prescribed command within the corresponding selected one management program.

23. A system configured for executing a plurality of management programs according to respective command formats, the system comprising:

means for validating a generic command received from a user, the validating means configured for specifying valid generic commands relative to a prescribed generic command format and having elements each specifying at least one corresponding generic command component and a corresponding at least one command action value, the validating means identifying one of the elements as a best match relative to the generic command; and a plurality of translators configured for issuing commands for the management programs according to respective command formats, the validating means outputting a prescribed command to a selected one of the translators based on the identified one element.

24. The system of claim 23, wherein the validating means comprises a command word translation table configured for storing for each prescribed command word a corresponding token for identification of a matching token, the validating means configured for determining a presence of the matching token for each input command word.

25. The system of claim 24, wherein the validating means recursively validates each input command word based on an order of the input command words for identification of the matching token within the identified one element.

26. The system of claim 25, wherein the validating means validates at least a portion of the generic command by identifying the one element having the best match relative to the portion of the generic command.

\* \* \* \* \*